(12) United States Patent
Agin (10) Patent No.: US 7,477,609 B2
(45) Date of Patent: Jan. 13, 2009

(54) METHOD FOR MANAGING PROCESSING RESOURCES IN A MOBILE RADIOCOMMUNICATION SYSTEM

(75) Inventor: Pascal Agin, Sucy En Brie (FR)

(73) Assignee: Evolium S.A.S., Paris (FR)

( * ) Notice: Subject to any disclaimer, the term of this patent is extended or adjusted under 35 U.S.C. 154(b) by 767 days.

(21) Appl. No.: 10/466,058

(22) PCT Filed: Jan. 10, 2002

(86) PCT No.: PCT/FR02/00079

§ 371 (c)(1),
(2), (4) Date: Jul. 10, 2003

(87) PCT Pub. No.: WO02/056628

PCT Pub. Date: Jul. 18, 2002

(65) Prior Publication Data

US 2004/0066744 A1    Apr. 8, 2004

(30) Foreign Application Priority Data

Jan. 12, 2001 (FR) .................................. 01 00440

(51) Int. Cl.
*H04B 7/216* (2006.01)
*H04Q 7/22* (2006.01)
*H04Q 7/38* (2006.01)

(52) U.S. Cl. .................... 370/252; 370/335; 370/342; 455/452.1

(58) Field of Classification Search ................. 370/335, 370/342, 465, 468, 252; 455/452.1
See application file for complete search history.

(56) References Cited

U.S. PATENT DOCUMENTS

| | | | | |
|---|---|---|---|---|
| 5,675,581 | A * | 10/1997 | Soliman | 370/252 |
| 6,049,549 | A * | 4/2000 | Ganz et al. | 370/449 |
| 6,434,380 | B1 * | 8/2002 | Andersson et al. | 455/406 |
| 6,483,820 | B1 * | 11/2002 | Davidson et al. | 370/329 |
| 6,553,021 | B1 * | 4/2003 | Bishop et al. | 370/347 |
| 6,738,624 | B1 * | 5/2004 | Aksentijevic et al. | 455/452.1 |
| 6,987,738 | B2 * | 1/2006 | Subramanian et al. | 370/252 |
| 2002/0021673 | A1 | 2/2002 | Agin et al. | |

FOREIGN PATENT DOCUMENTS

| | | |
|---|---|---|
| FR | 2 794 596 | 12/2000 |
| WO | WO 97/37503 | 10/1997 |
| WO | WO 99/09779 | 2/1999 |
| WO | WO 0044189 | 7/2000 |
| WO | WO 00/59160 | 10/2000 |

OTHER PUBLICATIONS

A. Iera et al, "Transport and Control Issues in Multimedia Wireless Networks", Wireless Networks, ACM, US, vol. 2, No. 3, Aug. 1, 1996, pp. 249-261, XP000625343.

* cited by examiner

*Primary Examiner*—Alpus H Hsu
(74) *Attorney, Agent, or Firm*—Sughrue Mion, PLLC

(57) ABSTRACT

A method of managing processing resources in a mobile radio system in which a first entity manages radio resources and corresponding processing resources provided in a separate second entity. The second entity signals to the fist entity its overall processing capacity and the amount of that overall processing capacity required for allocating radio resources for different bit rate values. The first entity then updates the capacity credit on each allocation of radio resources as a function of the corresponding bit rate.

20 Claims, 3 Drawing Sheets

METHOD FOR MANAGING PROCESSING RESOURCES IN A MOBILE RADIOCOMMUNICATION SYSTEM

BACKGROUND OF THE INVENTION

The present invention relates generally to mobile radio systems and more particularly to systems using the code division multiple access (CDMA) technique.

The CDMA technique is used in third generation systems such as the Universal Mobile Telecommunication System (UMTS), for example.

Figure 1:
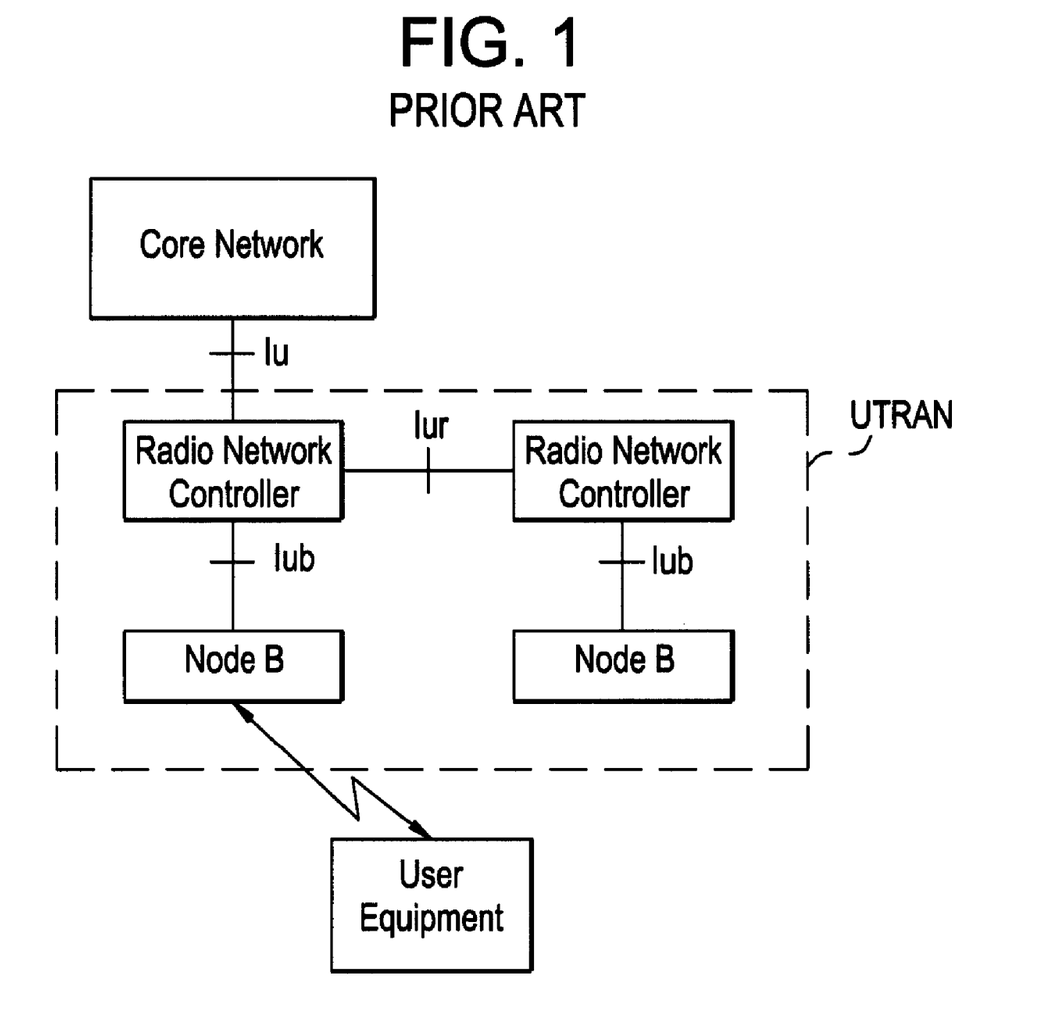
FIG. 1, described above, outlines the general architecture of a mobile radio system such as the UMTS, FIGS. 2 and 3, also described above, outline the main transmit and receive processing effected in a base station, such as a UMTS Node B.

As a general rule, a mobile radio network includes base stations and base station controllers, as shown in FIG. 1. In the UMTS, the network is known as the UMTS Terrestrial Radio Access Network (UTRAN), a base station is known as a Node B, and a base station controller is known as a Radio Network Controller (RNC).

A mobile station is known as a User Equipment (UE), and the UTRAN communicates with mobile stations via a Uu interface and with a Core Network (CN) via an Iu interface.

As shown in FIG. 1, an RNC is connected:

to a Node B via an Iub interface, to other RNC via an Iur interface, and to the core network (CN) via an Iu interface.

The RNC controlling a given Node B is known as the Controlling Radio Network Controller (CRNC) and is connected to the Node B via the Iub interface. The CRNC has a load control function and a radio resource allocation and control function for each Node B that it controls.

For a given call relating to a given user equipment UE, there is a Serving Radio Network Controller (SRNC) that is connected to the core network via the Iu interface. The SRNC has a control function for the call concerned, including the functions of adding or removing radio links in accordance with the macrodiversity transmission technique, monitoring parameters likely to change during a call, such as bit rate, power, spreading factor, etc.

In CDMA systems, capacity limitations at the radio interface are fundamentally different from their counterparts in systems using other multiple access techniques, such as the Time Division Multiple Access (TDMA) technique. The TDMA technique is used in second generation systems such as the Global System for Mobile communications (GSM), for example. In CDMA systems, at any time all users share the same frequency resource. The capacity of these systems is therefore limited by interference, for which reason these systems are also known as soft limited systems.

This is why CDMA systems use algorithms such as load control algorithms to prevent, detect, and where applicable correct overloads, in order to avoid degraded quality, and call admission control algorithms to decide (as a function of diverse parameters such as the service required for the call, etc.) if the capacity of a cell that is not being used at a given time is sufficient for a new call to be accepted in that cell. In the remainder of the description, these algorithms are grouped together under the generic name load control algorithms.

They ordinarily use only radio criteria and are ordinarily executed in the CRNC, which does not have any information on the processing capacity of each Node B that it controls. It can therefore happen that the CRNC accepts a new call only for the call to be finally rejected because of a shortage of processing resources in the Node B, which leads to unnecessary additional processing in the CRNC and additional exchanges of signaling between the CRNC and the Node B.

Of course, it would be possible to avoid these problems by providing each Node B with sufficient processing resources to cover all situations, including that of maximum capacity (which corresponds to the situation of a very low level of interference). However, this would lead to costly base stations that would be rated more highly than necessary most of the time. Furthermore, in the case of progressive introduction of services offered by these systems, the processing capacity of the base stations can be limited at the start of deployment of these systems and progressively increased thereafter.

It would therefore be desirable for load control in such systems to allow for the processing capacity of each base station (Node B).

Figure 2:
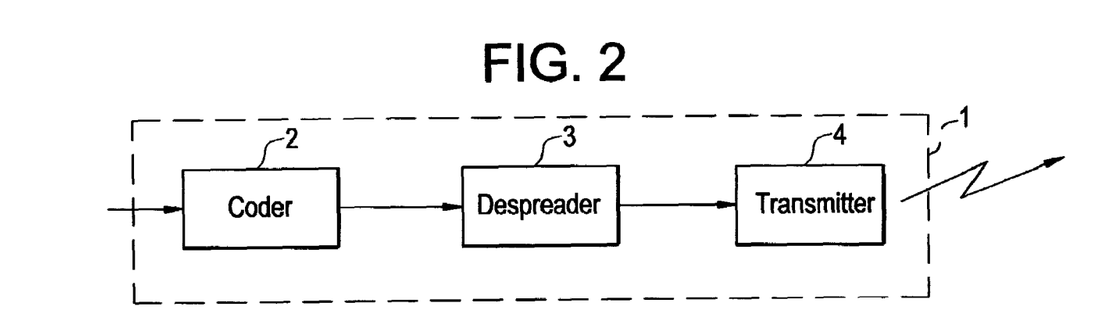
Figure 3:
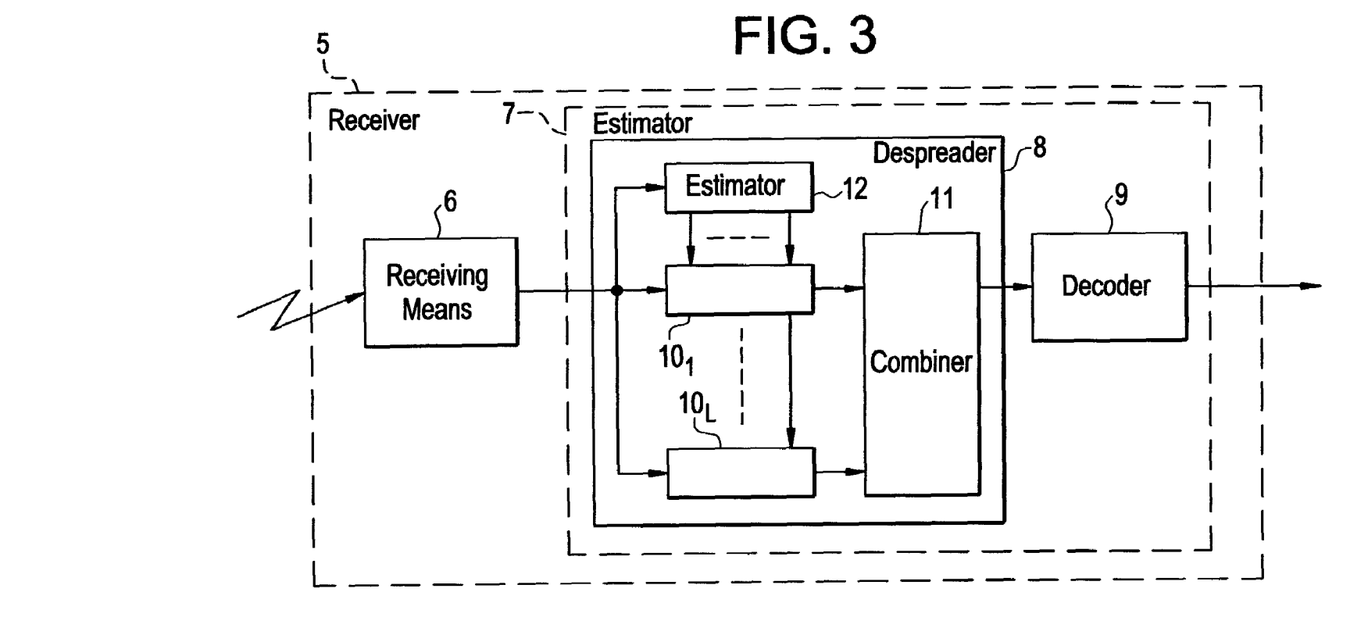

FIGS. 2 and 3 respectively outline the main transmit and receive processing used in a base station, for example a UMTS Node B.

FIG. 2 shows a transmitter 1 including:

channel coding means 2, despreading means 3, and radio frequency transmitter means 4.

These processing means are well known to the person skilled in the art and do not need to be described in detail here.

Channel coding uses techniques such as error corrector coding and interleaving to protect against transmission errors. This is also well known to the person skilled in the art.

Coding (such as error corrector coding) is intended to introduce redundancy into the information transmitted. The coding rate is defined as the ratio of the number of information bits to be transmitted to the number of bits actually transmitted or coded. Various quality of service levels can be obtained using different types of error corrector code. In the UMTS, for example, a first type of error corrector code consisting of a turbo code is used for a first type of traffic (such as high bit rate data traffic), while a second type of error corrector code consisting of a convolutional code is used for a second type of traffic (such as low bit rate data or voice traffic).

Channel coding generally also includes bit rate adaptation in order to adapt the bit rate to be transmitted to the bit rate offered for its transmission. Bit rate adaptation can include techniques such as repetition and/or puncturing, the bit rate adaptation rate then being defined as the repetition rate and/or the punch-through rate.

The raw bit rate is defined as the bit rate actually transmitted at the radio interface. The net bit rate is the bit rate obtained after deducting from the raw bit rate everything that is of no utility to the user, for example the redundancy introduced by the coding process.

Spreading uses spectrum spreading principles that are well known to the person skilled in the art. The length of the spreading code used is known as the spreading factor.

It should not be forgotten that, in a system such as the UMTS, the net bit rate (which is referred to hereinafter for simplicity as the bit rate) can vary during a call, and that the spreading factor can vary as a function of the bit rate to be transmitted.

FIG. 3 shows a receiver 5 including:

radio frequency receiver means 6, received data estimation means 7, including despreader means 8 and channel decoder means 9.

These processing means are well known to the person skilled in the art and therefore do not need to be described in detail here.

FIG. 3 shows an example of processing carried out in the despreader means 8. The processing is carried out in a rake receiver to improve the quality of received data estimation using multipath phenomena, i.e. propagation of the same source signal along multiple paths, such as results from multiple reflections from elements in the environment, for example. Unlike TDMA systems, CDMA systems can exploit the multiple paths to improve received data estimation quality.

A rake receiver has a set of L fingers $10_1$ to $10_L$ and means 11 for combining signals from the fingers. Each finger despreads the signal received via one of the paths that are taken into account, as determined by means 12 for estimating the impulse response of the transmission channel. To optimize received data estimation quality, the means 11 combine the despread signals corresponding to the paths that are taken into account.

The reception technique using a rake receiver is also used in conjunction with the macrodiversity transmission technique, whereby the same source signal is transmitted simultaneously to the same mobile station by a plurality of base stations. By using a rake receiver, the macrodiversity transmission technique not only improves receive performance but also minimizes the risk of call loss during handover. For this reason it is also known as soft handover, as compared to hard handover, in which a mobile station is connected to only one base station at any given time.

The received data estimating means can also use various techniques for reducing interference, such as the multi-user detection technique.

It is also possible to use a plurality of receive antennas. To optimize received data estimation quality the received data estimator means then further include means for combining signals received via the multiple receive antennas.

Channel decoding includes functions such as deinterleaving and error corrector decoding. Error corrector decoding is generally much more complex than error corrector coding and can use techniques such as maximum likelihood decoding, for example. A Viterbi algorithm can be used for convolutional codes, for example.

To be able to process several users simultaneously, a base station (Node B) includes transmitters and receivers such as the transmitter and the receiver outlined above and therefore requires a high receive processing capacity for received data estimation.

As mentioned above, for monitoring the load in a system such as the UMTS, for example, it is therefore desirable to take account of the processing capacity of a base station.

For the UMTS, for example, the 3G document TS 25.433 published by the $3^{rd}$ Generation Partnership Project (3GPP) specifies that, for each value of the spreading factor (SF) for which there is provision within the system, the Node B must signal to the CRNC its overall processing capacity (also known as the capacity credit) and the amount of that overall processing capacity (also known as the consumption cost) that is necessary for allocating a physical channel. The set of all consumption costs for all possible values of the spreading factor is also known as the capacity consumption law. This information is signaled by a Node B to the CRNC each time that the processing capacity of the Node B changes, using a Resource Status Indication message, or in response to a request from the CRNC, using an Audit Response message.

French Patent Application No. 0010538 filed Aug. 10, 2000 by the Applicant states that this kind of solution is not suitable for taking account of processing capacity limitations in a Node B, for the following reasons:

The channel decoding processing depends on the net bit rate rather than the gross bit rate or the spreading factor. For example, considering a spreading factor of 128 (and thus a raw bit rate of 30 kbit/s), the net bit rate can have different values depending on the coding rate and the bit rate adaptation rate, and the net bit rate can typically vary from 5 to 15 kilobits per second (kbit/s). Consequently, for a fixed spreading factor, the amount of processing in the Node B can vary significantly (for example by a factor exceeding 3). This is not taken into account in the prior art solution.

The number of fingers of the rake receiver required for transmission channel and data estimation is highly dependent on the number of a radio links. In the prior art solution, the maximum number of fingers of the rake receiver in the Node B cannot be taken into account in algorithms such as load control algorithms or call admission control algorithms, as this type of limitation is not linked to the spreading factor.

The processing capacity signaled by the Node B to the CRNC is an overall processing capacity that cannot take account of limitations in the processing capacity of the Node B.

The earlier patent application proposes another approach whereby, to take account of limitations in the processing capacity of a Node B, the Node B signals to the CRNC one or more parameters such as the maximum number of radio links that can be set up and the maximum net bit rate for the radio links that have been set up, possibly for each transmission direction and/or for each type of channel coding that can be used.

The present invention provides a new approach which retains the concept of overall processing capacity (also known as the capacity credit) but in which the consumption cost is no longer signaled for each possible value of the spreading factor, but instead for possible values of the bit rate (as already indicated hereinabove, the Applicant has noted that the bit rate is more representative of the processing capacity of a Node B than the spreading factor).

However, a new approach of this kind implies that new problems need to be solved.

A first problem is that, although the number of possible spreading factors is finite (for example, there are eight possible spreading factors in the UMTS: 4, 8, 16, 32, 64, 128, 256, 512), the bit rate can take any positive value. It is clear that in practice it is not possible or realistic for the Node B to signal the consumption cost to the CRNC for all bit rate values.

A second problem is that, at least under the present standard, the CRNC does not know the bit rate in order to update the capacity credit on each allocation of resources as a function of the corresponding bit rate. However, in the above-outlined prior art solution, the CRNC knows the spreading factor because the SRNC signals the spreading factor to the CRNC if a new radio link is added, removed, or reconfigured.

A third problem is that the bit rate need not be fixed, but may vary. However, the spreading factor is fixed, at least for the downlink direction, and is signaled in the manner mentioned above. The spreading factor for the uplink direction also varies, but the Applicant has noted that this aspect of the problem is not taken into consideration in the above-outlined prior art solution using the spreading factor.

SUMMARY OF THE INVENTION

The present invention additionally provides a solution to the above problems.

Thus in one aspect the present invention provides a method of managing processing resources in a mobile radio system in which a first entity manages radio resources and corresponding processing resources provided in a separate second entity, in which method:

the second entity signals to the fist entity its overall processing capacity (also known as the capacity credit) and the amount of that overall processing capacity (also known as the consumption cost) required for allocating radio resources for different bit rate values, and the first entity updates the capacity credit on each allocation of radio resources as a function of the corresponding bit rate.

It will be noted that the reference to allocation of radio resources is intended to encompass all operations likely to modify the allocation of radio resources within the system, including not only allocation operations as such, but also deallocation and reconfiguration operations.

Thus in the UMTS, these operations correspond:

for the dedicated transport channels, to the radio link set-up, radio link addition, radio link deletion, and radio link reconfiguration procedures defined in the 3G document TS 25.433 published by the 3GPP, and for the common transport channels, to the common transport channel set-up, common transport channel deletion, and common transport channel reconfiguration procedures also defined in the 3G document TS 25.433 published by the 3GPP.

It will also be noted that the reference to updating the capacity credit is intended to cover not only operations which debit the capacity credit, when new radio resources are required, but also operations which credit the capacity credit, when radio resources are no longer necessary and are therefore released.

Accordingly:

the capacity credit is debited for the radio link set-up, radio link addition and common transport channel set-up procedures, the capacity credit is credited for the radio link deletion and common transport channel deletion procedures, and the capacity credit is debited or credited for radio link reconfiguration and common transport channel reconfiguration according to whether the difference between the consumption cost for the new bit rate and that for the old bit rate is negative or positive.

According to another feature, said different bit rate values correspond to predetermined bit rate values referred to as reference bit rates.

According to another feature, the consumption cost for said corresponding bit rate is obtained from the consumption cost for reference bit rates.

According to another feature, the consumption cost for said corresponding bit rate is obtained from the consumption cost for reference bit rates by interpolation.

According to another feature, when the bit rate R is not a reference bit rate, the consumption cost is calculated as a function of consumption costs $C_{inf}$ and $C_{sup}$ corresponding to the reference bit rates $R_{inf}$ and $R_{sup}$ that are the closest to the bit rate R, and where $R_{inf} < R_{sup}$, in accordance with the following equation:

$$\text{Consumption\_cost} = C_{inf} + \frac{R - R_{inf}}{R_{sup} - R_{inf}}(C_{sup} - C_{inf})$$

According to another feature, the consumption cost is set at zero if the interpolation result is negative.

According to another feature, said corresponding bit rate corresponds to a maximum bit rate.

According to another feature, said maximum bit rate is obtained from the equation:

$$\text{Maximum\_bit\_rate} = \text{Max}_j \, br_j$$

where:

$$br_j = \sum_{k=1}^{n} \frac{N_k^{(j)} L_k^{(j)}}{TTI_k}$$

and in which $br_j$ is the bit rate of the $j^{th}$ transport format combination (TFC) in the TFCS, n is the number of transport channels in the CCTrCh, $N_k^{(j)}$ and $L_k^{(j)}$ are respectively the number of transport blocks and the size of the transport blocks expressed as a number of bits for the $k^{th}$ transport channel in the $j^{th}$ TFC, and $TTI_k$ is the transmission time interval (TTI) expressed in seconds of the $k^{th}$ transport channel According to another feature, said corresponding bit rate corresponds to an effective bit rate.

According to another feature, different consumption costs are signaled for different transport channels or different transport channel types.

According to another feature, different consumption costs and different capacity credits are signaled for the uplink and downlink transmission directions.

According to another feature, different consumption costs are signaled for a first radio link and for an additional radio link.

According to another feature, different consumption costs are signaled for different types of processing, in particular for different types of channel coding.

According to another feature, different consumption costs are signaled for different transport channels multiplexed within the same coded composite transport channel.

According to another feature, said system is a CDMA system.

According to another feature, said first entity is a base station controller.

According to another feature, said second entity is a base station.

Another aspect of the invention consists in a mobile radio system for implementing a method of the above kind, in which system a first entity manages radio resources and corresponding processing resources provided in a separate second entity, in which system:

the second entity includes means for signaling to the fist entity its overall processing capacity (which is also known as the capacity credit) and the amount of that overall processing capacity (which is also known as the consumption cost) required for allocating radio resources for different bit rate values, and the first entity includes means for updating the capacity credit on each allocation of radio resources as a function of the corresponding bit rate.

Another aspect of the invention consists in a mobile radio system for implementing a method of the above kind, said base station including means for signaling to a base station controller its overall processing capacity (which is also known as the capacity credit) and the amount of that overall processing capacity (which is also known as the consumption cost) necessary for allocating radio resources for different bit rate values.

Another aspect of the invention consists in a base station controller for a mobile radio system for implementing a method of the above kind, said base station controller including:

- means for receiving from a base station its overall processing capacity (which is also known as the capacity credit) and the amount of that overall processing capacity (which is also known as the consumption cost) required for allocating radio resources for different bit rate values, and
- means for updating the capacity credit on each allocation of radio resources as a function of the corresponding bit rate.

BRIEF DESCRIPTION OF THE DRAWINGS

Other objects and features of the present invention become apparent on reading the following description of embodiments of the invention, which is given with reference to the accompanying drawings, in which.

DETAILED DESCRIPTION OF THE INVENTION

One aspect of the present invention therefore provides a method of managing processing resources in a mobile radio system in which a first entity (for instance a base station controller or a CRNC in a system such as the UMTS) manages radio resources and corresponding processing resources provided in a separate second entity (for example a base station or a Node B in a system such as the UMTS), in which method:

- the second entity signals to the fist entity its overall processing capacity (which is also known as the capacity credit) and the amount of that overall processing capacity (which is also known as the consumption cost) required for allocating radio resources for different bit rate values, and
- the first entity updates the capacity credit on each allocation of radio resources as a function of the corresponding bit rate.

In other words, the present invention retains the overall processing capacity (capacity credit) concept, but no longer signals the consumption cost for each possible value of the spreading factor, but instead for various possible values of the bit rate (because, as previously indicated, the Applicant has observed that the bit rate is more representative of the processing capacity of a Node B than the spreading factor).

Furthermore, to solve the first problem mentioned above, the cost is signaled for only a few typical values of the bit rate, referred to hereinafter as reference bit rates, and a solution is additionally proposed for determining the cost for any bit rate value from costs signaled for the reference bit rates. For example, linear interpolation can be used (this is the simplest solution), ensuring that the cost always remains positive (i.e. if the result of the interpolation is negative, the resultant cost is zero).

For example, when the bit rate R is not a reference bit rate, the Consumption_cost is calculated as a function of costs $C_{inf}$ and $C_{sup}$ corresponding to the reference bit rates $R_{inf}$ and $R_{sup}$ which are the closest to the bit rate R and where $R_{inf} < R_{sup}$, using the following equation:

$$\text{Consumption\_cost} = C_{inf} + \frac{R - R_{inf}}{R_{sup} - R_{inf}}(C_{sup} - C_{inf}) \quad (1)$$

If the result is negative, the consumption cost can be set at zero, i.e.:

Consumption_cost=0

Other interpolation techniques can be used, of course.

The reference bit rates can be 4.75 kbit/s, 12.2 kbit/s, 64 kbit/s, 144 kbit/s, 384 kbit/s, and 2 048 kbit/s, for example.

Furthermore, in a system such as the UMTS, for example, one solution to the second and third problems previously mentioned is to derive the bit rate as a function of a transport format combination set (TFCS) parameter.

It should not be forgotten that one feature of a system like the UMTS is the possibility of transporting a plurality of services on the same connection, i.e. a plurality of transport channels (TrCH) on the same physical channel. The transport channels are processed separately in accordance with a channel coding scheme (including error detector coding, error corrector coding, bit rate adaptation and interleaving, see FIG. 2) before they are time division multiplexed to form a coded composite transport channel (CCTrCH) to be transmitted on one or more physical channels. For more information on these aspects of the UMTS, see the 3G document TS 25.212 V3.0.0 published by the 3GPP.

It should also not be forgotten that another feature of a system like the UMTS is that it allows users to use bit rates that can vary during a call. The data transported by the transport channels is organized into data units known as transport blocks that are received periodically at a transmission time interval (TTI). The number and the size of the transport blocks received for a given transport channel vary as a function of the bit rate. The transport format is defined as the known number and size of the transport blocks (and thus the instantaneous bit rate) for a given transport channel. The transport format combination (TFC) is defined as a combination of transport formats authorized for different transport channels to be multiplexed onto the same coded composite transport channel. Finally, the transport format combination set (TFCS) is defined as the set of all possible combinations of transport formats. For more information on these aspects of the UMTS see the 3G document TS 25.302 V3.7.0 published by the 3GPP.

The bit rate for each TFC within a TFCS can then be calculated using the following equation, in which $br_j$ is the bit rate of the $j^{th}$ TFC in the TFCS, n is the number of transport channels in the CCTrCh, $N_k^{(j)}$ and $L_k^{(j)}$ are respectively the number of transport blocks and the size of the transport blocks (expressed as a number of bits) for the $k^{th}$ transport channel in the $j^{th}$ TFC, and $TTI_k$ is the transmission time interval (expressed in seconds) of the $k^{th}$ transport channel:

$$br_j = \sum_{k=1}^{n} \frac{N_k^{(j)} L_k^{(j)}}{TTI_k} \quad (2)$$

Other formulas can be used, of course, depending on how the bit rate for the data to be processed is defined.

Furthermore, the problem is that the bit rate is not fixed, but can vary (i.e. any TFC within the TFCS can be used during a call), and the variation is not known a priori to the Node B or the UE, and in fact cannot be known a priori. The simplest solution is to consider only the maximum bit rate or the bit rate that maximizes the consumption cost (which is usually equal to the maximum bit rate, but this is not always the case), for all the TFC within the TFCS. If a new radio link is accepted, it is necessary to verify that the Node B has sufficient resources to process bit rates up to the maximum bit rate authorized for the new radio link.

If the maximum bit rate is defined as follows:

$$\text{Maximum\_bit\_rate} = \text{Max}_j \, br_j \quad (3)$$

equation (1) then becomes:

$$\text{Consumption\_cost} = C_{inf} + \frac{\text{Maximum\_bit\_rate} - R_{inf}}{R_{sup} - R_{inf}}(C_{sup} - C_{inf}) \quad (4)$$

Processing resource management is therefore based on the following parameters, which the Node B must signal to the CRNC, both for the dedicated transport channels (corresponding to radio resources allocated individually to users) and for the common transport channels (corresponding to radio resources shared between a plurality of users):

the total capacity (which is also known as the total credit) that defines the processing resources of the Node B, and the consumption law that gives the consumption cost for typical reference bit rates and allows the consumption costs for all possible bit rates to be determined using interpolation techniques.

Two signaling messages defined in the technical specification can be used to this end, namely a Resource Status Indication message which the Node B sends the CRNC each time that the processing resources of the Node B are changed and an Audit Response message which the CRNC sends in response to a request from the RNC.

The CRNC then updates the remaining credit on each resource allocation, i.e. in the UMTS:

for the dedicated channels, during radio link set-up, radio link addition, radio link deletion and radio link reconfiguration procedures defined in the 3G document TS 25.433 published by the 3GPP, and for the common channels, during common transport channel set-up, common transport channel deletion and common transport channel reconfiguration procedures also defined in the 3G document TS 25.433 published by the 3GPP.

The 3G technical specification TS 25.433 defines two separate consumption laws, one for dedicated channels and one for common channels. Accordingly, in the UMTS, the consumption law for the dedicated channels applies to the DCH (dedicated channel) and the DSCH (downlink shared channel), and the consumption law for the common channels applies to channels such as the RACH (random access channel), FACH (forward access channel), CPCH (common packet channel), SCCPCH (secondary common control physical channel), etc.

The consumption law for the dedicated channels also applies to the DSCH because, although this channel is in reality a common channel, it is always associated with a DCH and the set-up, deletion and reconfiguration procedures that relate to the DSCH simultaneously relate to the DCH. For example, one or two operations can be executed to effect a radio link set-up operation, namely one operation for the DCH and, where applicable (if a DSCH is associated with the DCH), one operation for the DSCH.

Moreover, this process can be effected globally for both transmission directions (uplink and downlink) or for each transmission direction (in which case the uplink and downlink directions are processed separately); in the latter case, a total credit is given for each direction and the consumption cost is given for each reference bit rate and for each direction.

Moreover, it is possible to specify a different consumption cost for dedicated channels according to whether the radio link concerned is the first or not (in the latter case the UE has more than one radio link in the same Node B, i.e. the UE is in a situation with respect to the Node B that is known as softer handover). The corresponding consumption costs are then referred to as the cost for a first radio link and the cost for an additional radio link.

However, as the soft handover or softer handover technique cannot be used for the DSCH, it would be logical for the cost for a first radio link always to apply to the DSCH (whereas the cost for a first radio link or the cost for an additional radio link can apply to the DCH). Another (although less beneficial) option would be to apply the cost for an additional radio link both to the DCH and to the DSCH when the radio link concerned for the DCH is not the first (and otherwise to apply the cost for the first radio link to both channels).

It would also be possible for a particular physical or transport channel to have a fixed cost that does not depend on its bit rate or on its spreading factor (even if the TFCS exists), which might be zero, but which could depend on other parameters, for example the transmission direction (uplink or downlink).

For example, a special cost could be signaled for physical channels such as the AICH (acquisition indication channel), AP-AICH, CD/CA-ICH (collision detection/channel assignment indicator channel), or CSICH (CPCH status indication channel).

Other distinctions could be added. For example, a different consumption cost could be specified according to the type of processing, in particular according to the type of channel coding (for example, in the UMTS, according to whether a convolutional code or a turbo code is used).

Moreover, the solution example previously described, consisting in considering only the maximum bit rate, although simpler, nevertheless has the drawback that the processing resources reserved in this way in the Node B are probably overestimated, since processing resources corresponding to the maximum bit rate are reserved on each occasion. It may then happen that some processing resources are still available, although the credit is exhausted. In this case, a new radio link or common transport channel request could be refused, even if sufficient processing resources are in fact available in the Node B.

One solution to this would be for the CRNC to calculate the remaining credit not on the basis of the maximum bit rate but instead on the basis of the effective bit rate. The current TFC knows the effective bit rate, as previously explained. In this case, the Node B would still signal the same information to the CRNC, and only the algorithm for updating the remaining credit, which is implemented in the CRNC, would change: it would then be necessary to update the credit more frequently (each time that the TFC changes).

For dedicated channels (DCH), one problem in implementing this kind of solution is that call admission control is implemented in the CRNC which, according to the current version of the technical specifications, does not know the instantaneous TFC (the CRNC knows only the TFCS, and the UE, the Node B and the SRNC know the TFC). Nevertheless, this kind of solution could be applicable with appropriate signaling, or if call admission control were implemented in an entity knowing this information.

For common transport channels (including the DSCH) this kind of solution would seem to be applicable according to the current version of the technical specifications (both for the uplink direction and for the downlink direction), since the MAC-c/sh function (which chooses the TFC for the common and shared channels) is implemented in the CRNC.

Moreover, another drawback of the solution example previously described is that if a plurality of transport channels is multiplexed onto a physical channel and the transport channels do not require the same processing resources, for example because one uses a convolutional code and the other uses a turbo code, the cost is chosen as a function of the overall bit rate, without taking into account the fact that the two transport channels require different processing resources.

One solution to this would be to signal the consumption cost per bit rate and per transport channel, the CRNC calculating the total cost for all the transport channels as a function of the transport channel types. This kind of solution would make it possible to distinguish between the various transport channels, thus allowing different consumption costs for different transport channels having different characteristics. As previously described, the consumption costs can be based on the maximum bit rate of the transport channel concerned (which is given by the TFCS) or the effective bit rate (which is given by the current TFC).

Figure 4:
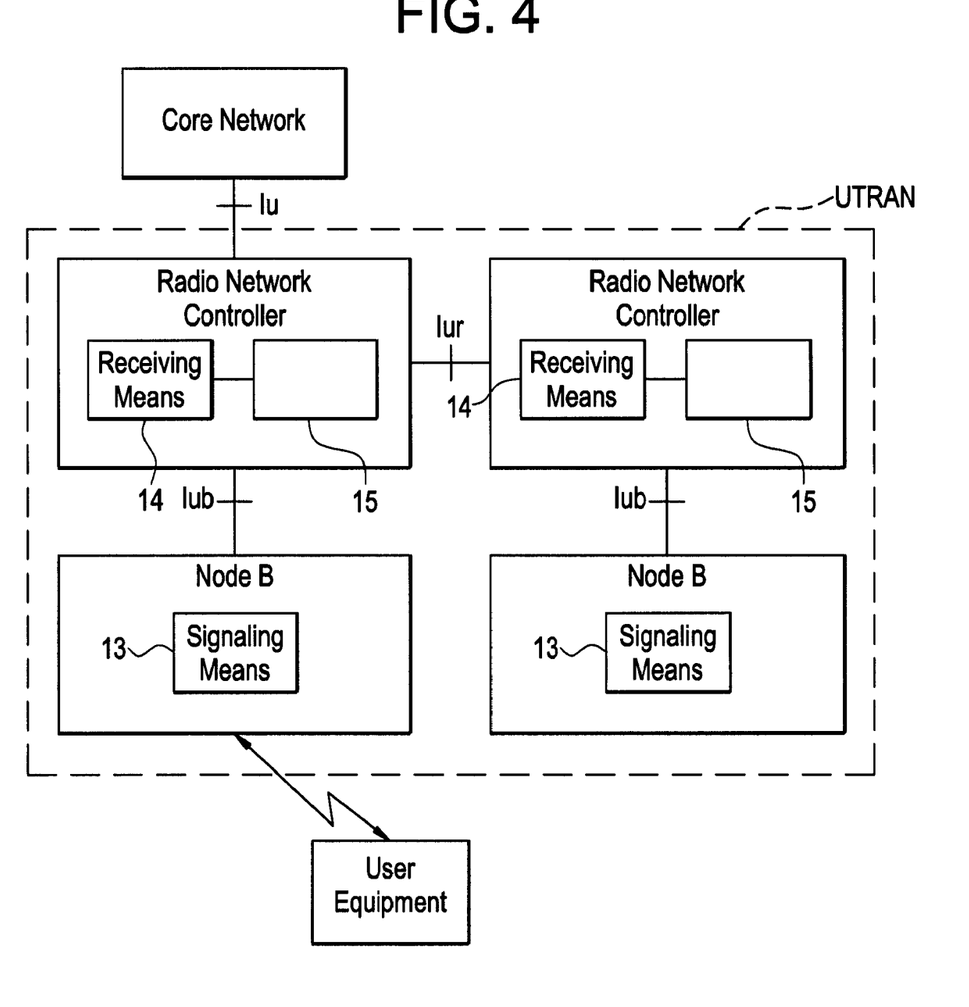
FIG. 4 is a diagram illustrating one implementation of a method of the invention.

FIG. 4 is a diagram showing one example of the means to be provided in accordance with the invention in a base station (or in a UMTS Node B) and in a base station controller (or in a UMTS RNC) to implement a method according to the invention.

A base station, or Node B, thus includes, in addition to other means, which can be conventional means, means 13 for signaling to a base station controller its overall processing capacity (which is also known as the capacity credit) and the amount of that overall processing capacity (which is also known as the consumption cost) necessary for allocating radio resources for different bit rate values.

A base station controller (RNC) thus includes, in addition to other means that can be conventional means:
  means 14 for receiving from a base station its overall processing capacity (which is also known as the capacity credit) and the amount of that overall processing capacity (which is also known as the consumption cost) required for allocating radio resources for different bit rate values, and
  means 15 for updating the capacity credit on each allocation of radio resources as a function of the corresponding bit rate.

The above means can operate in accordance with the method as previously described; their particular implementation representing no particular problem for the person skilled in the art, such means need not be described here in more detail than by stating their function.

What is claimed is:

1. A method of managing processing resources in a mobile radio system in which a first entity manages radio resources and corresponding processing resources provided in a separate second entity, the method comprising the steps of:
  the second entity signaling to the first entity a capacity credit representing an overall processing capacity of said second entity and a consumption cost representing an amount of that overall processing capacity required for allocating radio resources for different values of bit rate R, and
  the first entity updating the capacity credit on each allocation of radio resources as a function of the corresponding bit rate R.

2. A method according to claim 1, wherein said different bit rate values correspond to predetermined bit rates referred to as reference bit rates.

3. A method according to claim 2, wherein the consumption cost for said corresponding bit rate R is obtained from the consumption cost for said reference bit rates.

4. A method according to claim 3, wherein the consumption cost for said corresponding bit rate R is obtained from the consumption cost for reference bit rates by interpolation.

5. A method according to claim 4, wherein, when the bit rate R is not a reference bit rate, the consumption cost is calculated as a function of consumption costs $C_{inf}$ and $C_{sup}$ corresponding to the reference bit rates $R_{inf}$ and $R_{sup}$ that are the closest to the bit rate R and where $R_{inf} < R_{sup}$, in accordance with the following equation:

$$\text{Consumption\_cost} = C_{inf} + \frac{R - R_{inf}}{R_{sup} - R_{inf}}(C_{sup} - C_{inf})$$

6. A method according to claim 4, wherein the consumption cost is set at zero if the interpolation result is negative.

7. A method according to claim 1, wherein said corresponding bit rate corresponds to a maximum bit rate.

8. A method according to claim 7, wherein said maximum bit rate is obtained from the equation:

Maximum_bit_rate=$\text{Max}_j \text{br}_j$ where:

$$br_j = \sum_{k=1}^{n} \frac{N_k^{(j)} L_k^{(j)}}{TTI_k}$$

and in which $br_j$ is the bit rate $j^{th}$ transport format combination (TFC) in the TFCS, n is the number of transport channels in the CCTrCH, $N_k^{(j)}$ and $L_k^{(j)}$ are respectively the number of transport blocks and the size of the transport blocks expressed as a number of bits for the $k^{th}$ transport channel in the $j^{th}$ TFC, and $TTI_k$ is the transmission time interval (TTI) expressed in seconds of the $k^{th}$ transport channel.

9. A method according to claim 1, wherein said corresponding bit rate corresponds to an actual bit rate.

10. A method according to claim 1, wherein different consumption costs are signaled for different transport channels or different transport channel types.

11. A method according to claim 1, wherein different consumption costs and different capacity credits are signaled for the uplink and downlink transmission directions.

12. A method according to claim 1, wherein different consumption costs are signaled for a first radio link and for an additional radio link.

13. A method according to claim 1, wherein different consumption costs are signaled for different types of processing, in particular for different types of channel coding.

14. A method according to claim 1, wherein different consumption costs are signaled for different transport channels multiplexed within the same coded composite transport channel.

15. A method according to claim 1, wherein said system is a CDMA system.

16. A method according to claim 1, wherein said first entity is a base station controller.

17. A method according to claim 1, wherein said second entity is a base station.

18. A mobile radio system for implementing a method of managing processing resources in a mobile radio system in which a first entity manages radio resources and corresponding processing resources provided in a separate second entity, in which system:
- the second entity includes means for signaling to the fist entity a capacity credit representing an overall processing capacity of said second entity and a consumption cost representing an amount of that overall processing capacity required for allocating radio resources for different bit rate values, and
- the first entity includes means for updating the capacity credit on each allocation of radio resources as a function of the corresponding bit rate.

19. A base station for a mobile radio system for implementing a method of managing processing resources in a mobile radio system in which a first entity manages radio resources and corresponding processing resources provided in a separate second entity, said base station including means for signaling to a base station controller a capacity credit representing an overall processing capacity of said base station and a consumption cost representing an amount of that overall processing capacity necessary for allocating radio resources for different bit rate values.

20. A base station controller for a mobile radio system for implementing a method of managing processing resources in a mobile radio system in which a first entity manages radio resources and corresponding processing resources provided in a separate second entity, said base station controller including:
- means for receiving from a base station a capacity credit representing an overall processing capacity of said base station and a consumption cost representing an amount of that overall processing capacity required for allocating radio resources for different bit rate values, and
- means for updating the capacity credit on each allocation of radio resources as a function of the corresponding bit rate.

* * * * *